(12) United States Patent
Brauchle et al.

(10) Patent No.: US 7,377,950 B2
(45) Date of Patent: May 27, 2008

(54) METHOD FOR OPERATING A PLANT FOR THE STEAM REFORMING OF HYDROCARBONS AND CORRESPONDING PLANT

(75) Inventors: Stefan Brauchle, Heroldstatt (DE); Matthias Wolfsteiner, Kirchheim/Teck (DE)

(73) Assignee: NuCellSys GmbH, Kirchheim/Teck-Nabern (DE)

( * ) Notice: Subject to any disclaimer, the term of this patent is extended or adjusted under 35 U.S.C. 154(b) by 699 days.

(21) Appl. No.: 09/984,339

(22) Filed: Oct. 29, 2001

(65) Prior Publication Data

US 2002/0053164 A1    May 9, 2002

Related U.S. Application Data

(63) Continuation of application No. PCT/EP00/01225, filed on Feb. 15, 2000.

(30) Foreign Application Priority Data

Apr. 27, 1999   (DE) ................................ 199 18 997

(51) Int. Cl.
*C01B 3/32* (2006.01)
*B01J 8/00* (2006.01)

(52) U.S. Cl. .................................... 48/197 R; 422/105

(58) Field of Classification Search ............ 48/197 R, 48/198.1, 198.7, 214 R, 214 A; 422/105, 422/107, 108, 110, 111, 115

See application file for complete search history.

(56) References Cited

U.S. PATENT DOCUMENTS

| | | | | |
|---|---|---|---|---|
| 3,585,078 A | * | 6/1971 | Sederquist et al. | 429/17 |
| 3,745,047 A | * | 7/1973 | Fanciullo et al. | 429/23 |
| 5,498,487 A | * | 3/1996 | Ruka et al. | 429/20 |
| 5,874,051 A | * | 2/1999 | Heil et al. | 422/171 |
| 5,984,986 A | * | 11/1999 | Wiesheu et al. | 48/203 |
| 6,048,473 A | * | 4/2000 | Denda et al. | 252/376 |
| 6,120,925 A | * | 9/2000 | Kawatsu et al. | 429/40 |
| 6,299,853 B1 | * | 10/2001 | Boneberg et al. | 423/652 |
| 6,495,113 B2 | * | 12/2002 | Aoyama | 423/247 |

FOREIGN PATENT DOCUMENTS

| | | |
|---|---|---|
| DE | 19 49 184 | 9/1969 |
| DE | 21 57 722 | 11/1971 |
| DE | 196 23 919 | 6/1996 |
| DE | 196 23 937 | 6/1996 |
| DE | 198 47 211 | 10/1998 |
| EP | 0 798 798 A2 * | 10/1997 |
| EP | 798 798 | 10/1997 |
| EP | 813 262 | 12/1997 |

* cited by examiner

*Primary Examiner*—Kevin P. Kerns
(74) *Attorney, Agent, or Firm*—Crowell & Moring LLP

(57) ABSTRACT

A method for operating a plant for the steam reforming of hydrocarbons, in particular methanol, in which, in a mixture-preparation stage, a steam/hydrocarbon mixture is prepared from water and at least one hydrocarbon. The prepared steam/hydrocarbon mixture is introduced into a reforming reactor. The steam/hydrocarbon mixing ratio is set or adapted in order to compensate for an aging-related long-term shift in a temperature profile within the reforming reactor.

2 Claims, 1 Drawing Sheet

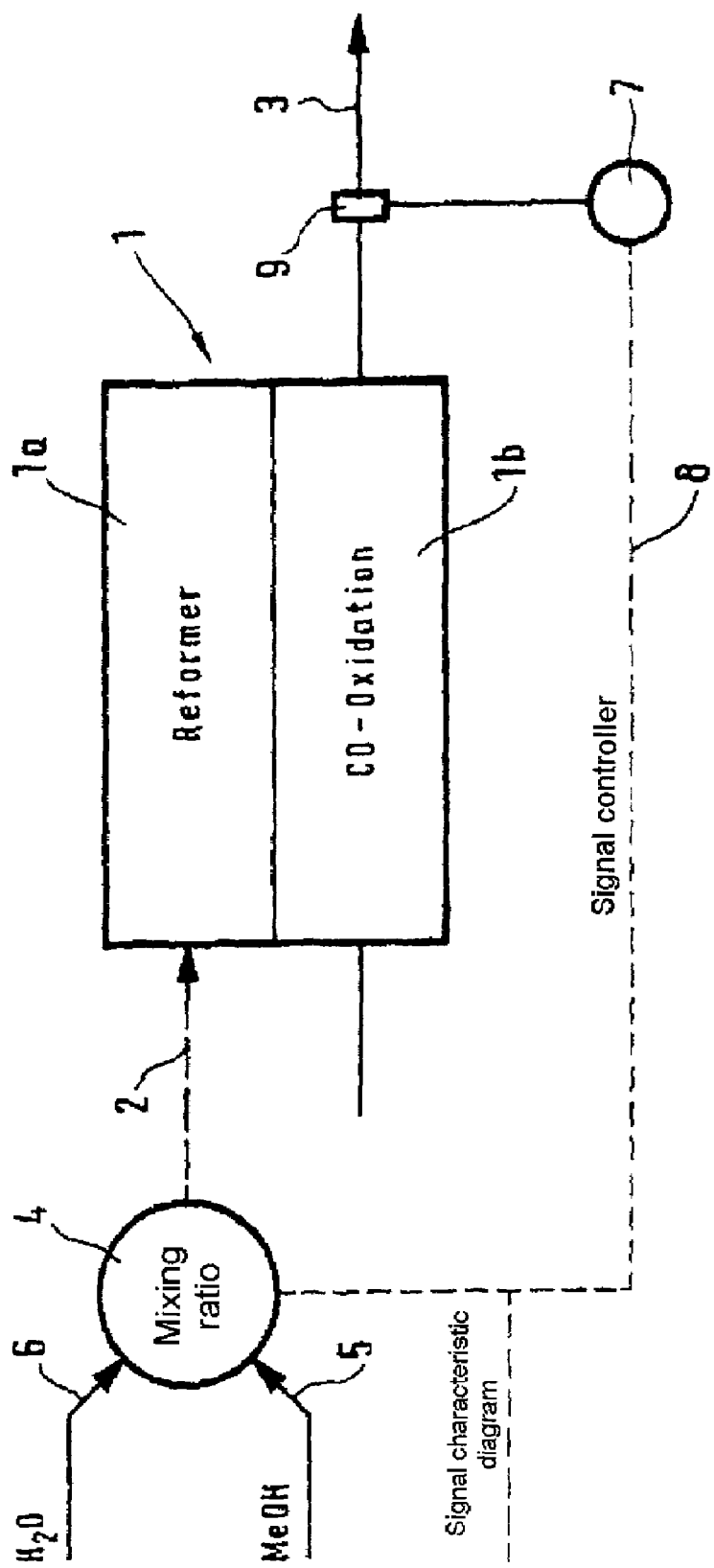

METHOD FOR OPERATING A PLANT FOR THE STEAM REFORMING OF HYDROCARBONS AND CORRESPONDING PLANT

This application is a continuation of PCT/EP00/01225 filed on Feb. 15, 2000 and claims the priority of German Patent Document No. 199 18 997.8, filed on Apr. 27, 1999, the disclosures of which are expressly incorporated by reference herein.

BACKGROUND AND SUMMARY OF INVENTION

The present invention relates to a method for operating a plant for the steam reforming of hydrocarbons, in particular methanol, and to a corresponding plant for carrying out the method.

Methods of this type are used, for example, to operate mobile plants for the steam reforming of methanol in fuel cell vehicles in order to obtain hydrogen for supplying the fuel cells. To operate plants of this type, it is known to set the amount of prepared steam/methanol mixture which is introduced into a reforming reactor variably as a function of the load of the plant. DE-B 19 49 184 (U.S. Pat. No. 3,585,078) and DE 21 57 722 C2 (U.S. Pat. No. 3,745,047) provide, where methane is used instead of methanol, a jet pump, the steam flow rate of which is set as a function of the load state of the plant. In the event of a load change, the incoming flow of methane also changes according to the jet pump characteristic.

It is known from DE 196 23 937 C1 to keep the steam/methanol mixing ratio of the steam/methanol mixture which is introduced into a reforming reactor at a predetermined desired level irrespective of brief load-change operations. This avoids undesirable brief increases in the CO concentration in the reformate caused by the water level in the steam/methanol mixture being too low. A sensor or a control unit for controlling the steam/methanol mixing ratio so that it is set to the desired value is arranged upstream of the reforming reactor.

DE 196 23 919 C1 (U.S. Pat. No. 5,984,986) has disclosed a method for operating a plant for the steam reforming of methanol in which the steam/methanol mixing ratio of the steam/methanol mixture introduced into the reforming reactor is set as a function of the load state and/or load changes of the plant, in such a manner that a CO concentration which remains constant across the entire load range is obtained in the reformate. A sensor that is used to provide the control unit with a signal which describes the load state is arranged downstream of the reforming reactor.

EP 0 798 798 A2 has disclosed a plant with a mixture preparation stage and a reforming reactor, which has a reformer and a CO oxidation stage. Means are present for setting the steam/hydrocarbon mixing ratio of the steam/hydrocarbon mixture fed to the reforming reactor. Between the reformer and the CO oxidation stage there is a sensor for determining the temperature of the reformate gas stream emerging from the reformer, a control unit adapting the quantity of air supplied to the reformer as a function of the temperature determined.

DE 198 47 211 C1 (EP 0 945 716) has disclosed a method for operating a device for generating hydrogen-rich gas, in which catalytic steam reforming of a hydrogen/fuel mixture is carried out in a reformer with thermal energy being supplied. In a CO oxidation stage, selective catalytic oxidation of carbon monoxide from the hydrogen-rich gas is carried out. Thermal energy is transferred from the CO oxidation stage into the reformer. In this method, a predetermined quantity of an oxygen-containing gas is fed to the gas mixture flow upstream of or in the CO oxidation stage. The quantity of the oxygen-containing gas which is supplied is set as a function of the temperature of the gas mixture flow at the outlet of the reformer/CO oxidation stage.

A common feature of all the methods described is that the control measures provided substantially relate to the problem of providing the most uniform possible operation of a plant for steam reforming even in the event of dynamic load changes. Long-term control which takes account of aging-related changes in characteristics of the reactor components is not possible with these measures.

Therefore, it is an object of the present invention to provide long-term control of a reforming reactor which is as simple and inexpensive as possible.

This object is achieved by a method and a corresponding plant for carrying out the method according to the present invention.

By controlling the starting-material composition (i.e., the water/hydrocarbon ratio), it is possible, in a simple manner, to counteract aging-related changes in the efficiency or ability to function of the reactor components, in particular aging-related shift in the temperature profile in the reactor bed. Increasing the water content leads to a higher CO concentration at the entry to a CO oxidation stage connected downstream of a reformer, with the result that overall a more uniform temperature profile is achieved. In this way, it is possible to effectively counteract aging of the reformer or of the CO oxidizer.

According to a preferred embodiment of the method according to the present invention, the mixing ratio of the steam/hydrocarbon mixture is set as a function of the temperature T of the gas stream emerging from the reforming reactor. It is easy to determine a temperature of this type and to reliably assign it to a temperature profile prevailing in the reforming reactor.

The temperature of the gas stream emerging from the reforming reactor is expediently controlled at a constant value by setting the steam/hydrocarbon mixing ratio. This makes it easy to keep the reforming parameters of the reforming reactor constant over a very long period.

According to a preferred embodiment of a plant according to the present invention, this plant has means for determining the temperature of the gas stream emerging from the reformer reactor, which are arranged downstream of the reforming reactor, and a control unit for acting on the mixture preparation stage, by which a suitable steam/hydrocarbon mixing ratio can be set. The control unit is responsible for controlling the mixture preparation stage using the temperature determined by the means for determining the temperature.

Other objects, advantages and novel features of the present invention will become apparent from the following detailed description of the present invention when considered in conjunction with the accompanying drawings.

BRIEF DESCRIPTION OF THE DRAWING

The sole FIGURE shows a diagrammatic, simplified block diagram of a plant for the steam reforming of methanol according to the present invention.

DETAILED DESCRIPTION OF THE DRAWING

The plant for the steam reforming of methanol, of which only the components which are relevant to the present invention are shown, can be used, for example, in a fuel cell vehicle to provide steam for supplying the fuel cells. The plant has a reforming reactor 1 which, from a steam/methanol mixture 2 supplied on the inlet side, generates a reformate 3 that contains the desired steam and emits this reformate. The reformate 3 emerges from the reforming reactor 1 as a gas stream. To prevent an undesirable proportion of carbon monoxide being included in the reformate 3, which could, for example, poison a downstream PEM fuel cell arrangement, a CO oxidation stage 1b, in which carbon monoxide can be converted into carbon dioxide, is arranged downstream of a reformer 1a of the reforming reactor 1.

The steam/methanol mixture 2 that is introduced into the reforming reactor 1 is produced in a mixture preparation stage 4, for which purpose methanol is fed to this stage 4 via a methanol feedline 5, and water is fed to this stage 4 via a water feedline 6. The liquid components can be mixed and then together can be evaporated or superheated. Alternatively, the two constituents can be evaporated separately and can then be mixed. Operation of the plant is controlled by a control unit 7. The structure of the reforming reactor 1, of the mixture preparation stage 4 and of the control unit 7 in this case corresponds to conventional designs of these components, and consequently these components require no further detail at this point.

As is known, for example, from the prior art, the reformer 1a, in which an endothermic reaction takes place, and the CO oxidation stage 1b, in which an exothermic reaction takes place, are directly coupled to one another. An air supply which can be added, for example, to the steam/methanol mixture 2 is not specifically illustrated.

The control unit 7 receives, for example via a sensor 9, a temperature signal which represents the temperature of the reformate or gas mixture stream emerging from the reforming reactor 1. Depending on the temperature signal which is determined, the control unit 7, via a line 8, emits a signal to the mixture preparation stage 4, which can be used to vary the mixing ratio of the starting-material stream (water/methanol ratio) generated by the mixture preparation stage 4.

By way of example, the mixture preparation stage 4 can be used to lower the steam/methanol ratio (to increase the proportion of methanol). Lowering the steam/methanol ratio in this way leads to a higher CO concentration being present at the outlet of the reformer 1a. The reason for this is the water gas shift equilibrium:

$$CO + H_2O \rightleftharpoons CO_2 + H_2$$

This increased CO concentration is therefore present at the inlet of the CO oxidation stage 1b. As a result, overall the temperature profile of the overall reformer-CO oxidation stage system shifts downwards (i.e., the temperature profile in the first part of the overall system shifts towards lower temperatures and in the later part of the overall system shifts towards higher temperatures). The overall result is a more uniform temperature profile, with the result that aging effects which have occurred in conventional reactors can be substantially reduced. The above-described lowering of the water/methanol ratio furthermore allows the system efficiency to be effectively increased.

With the procedure according to the present invention, it is possible, in particular, to effectively compensate for an aging-related shift in the temperature profile of the overall system (aging-related shift in the temperature profile towards the inlet side). This is because if the control unit 7, which may be designed in particular as a temperature controller, detects a lower temperature of the gas mixture emerging from the CO oxidation stage 1b, which is characteristic of the aging-related shift in the temperature profile, it is possible, by suitably changing the mixing ratio in the mixture preparation stage 4, to counteract this reduction in temperature at the outlet side of the system, as has been described above. The aging-related shift in the temperature profile in particular impairs the conversion capacity of the two reactor components, i.e. of the reformer 1a and of the CO oxidation stage 1b. Overall, therefore, the control unit 7, the mixture preparation stage 4, the reactor 1 and the temperature sensor 9 constitute a control circuit for controlling the gas mixture which emerges from the CO oxidation stage or the reactor 1.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within scope of the present invention.

What is claimed is:

1. A method for operating a plant for the steam reforming of hydrocarbons, comprising:
   providing a control circuit including a control unit, a mixture preparation stage, a reactor having a reformer and a CO oxidation stage, and a temperature sensor,
   in the mixture-preparation stage, generating a steam/hydrocarbon mixture from water and at least one hydrocarbon;
   introducing the prepared steam/hydrocarbon mixture into the reformer of the reforming reactor; and
   counteracting an aging-related shift in a temperature profile within the reforming reactor by setting a steam/hydrocarbon mixing ratio of the steam/hydrocarbon mixture generated in the mixture-preparation stage as a function of a temperature of a reformate gas stream emerging from the CO oxidation stage of the reforming reactor.

2. A method according to claim 1, wherein the temperature of the reformate gas stream is regulated to a constant value by setting the steam/hydrocarbon mixing ratio.

* * * * *